United States Patent
Feaver et al.

(10) Patent No.: US 9,726,030 B2
(45) Date of Patent: Aug. 8, 2017

(54) FLOW DEFLECTOR ARRANGEMENT

(71) Applicant: ROLLS-ROYCE PLC, London (GB)

(72) Inventors: Oliver George Feaver, Louth (GB); Andrew James Mullender, Derby (GB)

(73) Assignee: ROLLS-ROYCE plc, London (GB)

( * ) Notice: Subject to any disclaimer, the term of this patent is extended or adjusted under 35 U.S.C. 154(b) by 593 days.

(21) Appl. No.: 14/459,820

(22) Filed: Aug. 14, 2014

(65) Prior Publication Data
US 2015/0300188 A1    Oct. 22, 2015

(30) Foreign Application Priority Data
Aug. 30, 2013  (GB) .................................. 1315449.7

(51) Int. Cl.
*F01D 11/00*  (2006.01)
*F15D 1/10*  (2006.01)
(Continued)

(52) U.S. Cl.
CPC ................ *F01D 11/00* (2013.01); *F01D 1/02* (2013.01); *F01D 9/041* (2013.01); *F02C 7/12* (2013.01);
(Continued)

(58) Field of Classification Search
CPC ...... F05B 2260/603; F01D 1/02; F01D 9/041; F01D 11/00; F15D 1/0015; F15D 1/10;
(Continued)

(56) References Cited

U.S. PATENT DOCUMENTS 5,259,725 A    11/1993  Hemmelgarn et al.
8,091,371 B2 *  1/2012  Durocher ................ F01D 9/065
                                                                    415/213.1
(Continued)

FOREIGN PATENT DOCUMENTS

EP    1 074 697 A2    2/2001
EP    1113159 A2      7/2001
(Continued)

OTHER PUBLICATIONS

Mar. 27, 2015 European Search Report issued in European Patent Application No. 14 18 0983.
Mar. 3, 2014 Search Report issued in British Application No. GB1315449.7.

*Primary Examiner* — Craig Kim
*Assistant Examiner* — Jason Mikus
(74) *Attorney, Agent, or Firm* — Oliff PLC

(57) ABSTRACT

A flow deflector arrangement is used in combination with a pipe arrangement secured through a component, the flow deflector arrangement comprising: a nut to secure the pipe arrangement to the component, and a shroud for attachment to the component so as to extend at least partially around the pipe arrangement when the pipe arrangement is secured to the component by the nut. The nut has an outwardly directed flange to adopt a position spaced from the component, and the shroud defines at least one deflector surface which, when the shroud is attached to the component, extends away from the component in spaced relation to the pipe arrangement. The flange and the deflector surface cooperate in deflecting a flow of fluid flowing from the component and along the outside of the pipe arrangement such that the flow is deflected generally outwardly from the pipe arrangement with a degree of swirl.

15 Claims, 6 Drawing Sheets

(51) Int. Cl.
*F15D 1/00* (2006.01)
*F02C 7/12* (2006.01)
*F02C 7/24* (2006.01)
*F01D 1/02* (2006.01)
*F01D 9/04* (2006.01)

(52) U.S. Cl.
CPC .............. *F02C 7/24* (2013.01); *F15D 1/0015* (2013.01); *F15D 1/10* (2013.01); *F05D 2220/32* (2013.01); *F05D 2230/72* (2013.01); *F05D 2240/11* (2013.01); *F05D 2260/31* (2013.01)

(58) Field of Classification Search
CPC .......... F02C 7/12; F02C 7/24; F05D 2220/32; F05D 2230/72; F05D 2240/11; F05D 2260/31
USPC ...................................................... 415/168.1
See application file for complete search history.

(56) References Cited

U.S. PATENT DOCUMENTS

| | | | |
|---|---|---|---|
| 8,863,531 B2 * | 10/2014 | Scott | ......................... F02C 7/18 415/115 |
| 2006/0157592 A1 * | 7/2006 | Mahnken | ............... F16L 23/167 239/461 |
| 2008/0115484 A1 | 5/2008 | Conete et al. | |
| 2011/0206504 A1 | 8/2011 | Blanchard et al. | |
| 2014/0003920 A1 * | 1/2014 | Scott | ......................... F01D 25/12 415/177 |

FOREIGN PATENT DOCUMENTS

| | | |
|---|---|---|
| EP | 2 415 992 A2 | 2/2012 |
| GB | 2471770 A | 1/2011 |

* cited by examiner

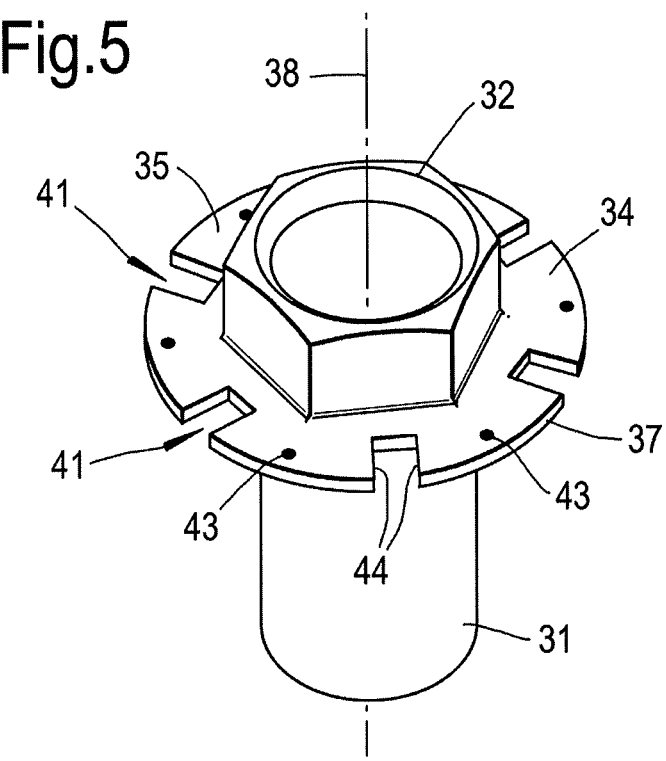
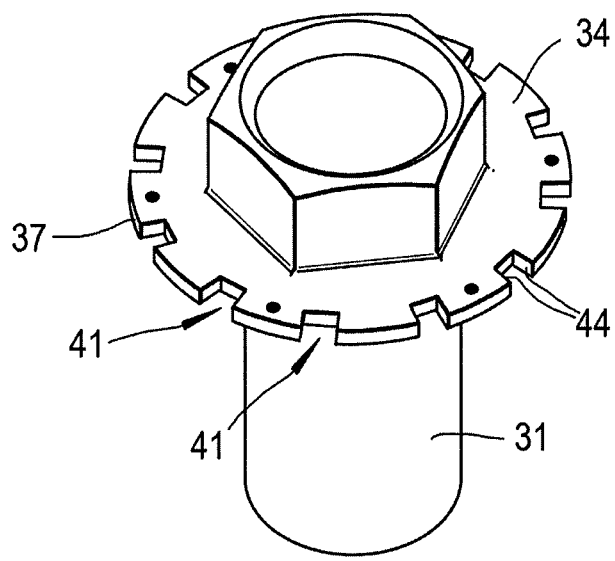

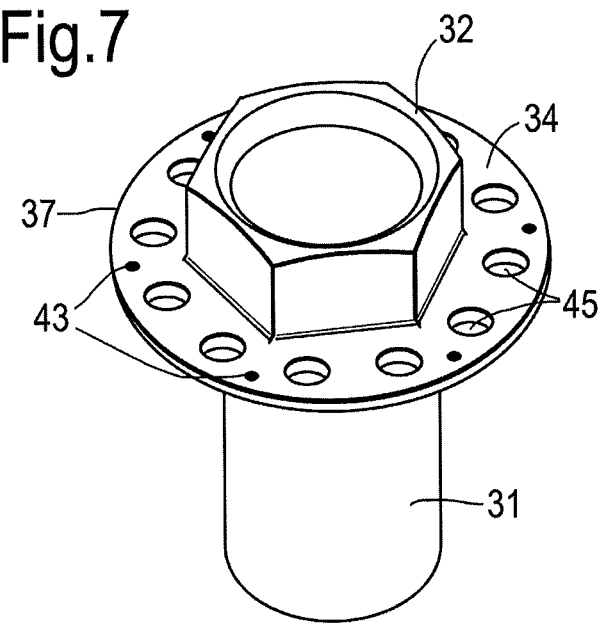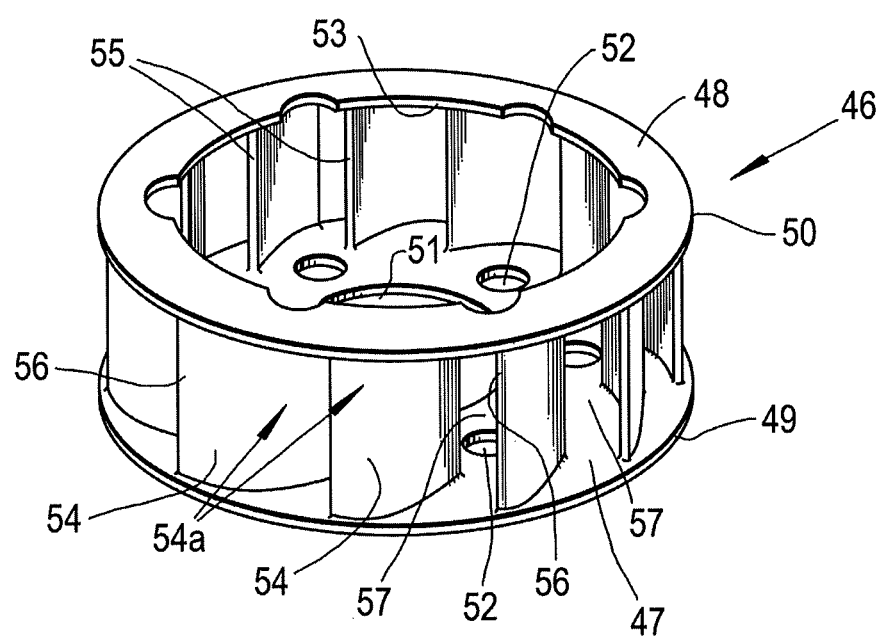

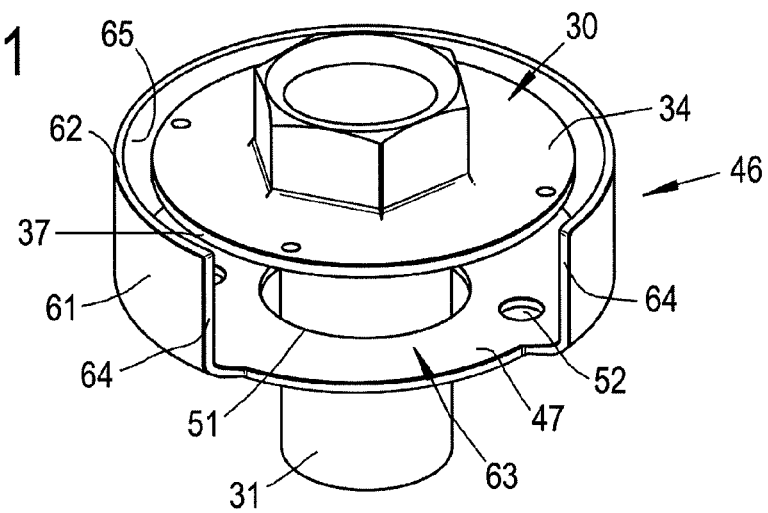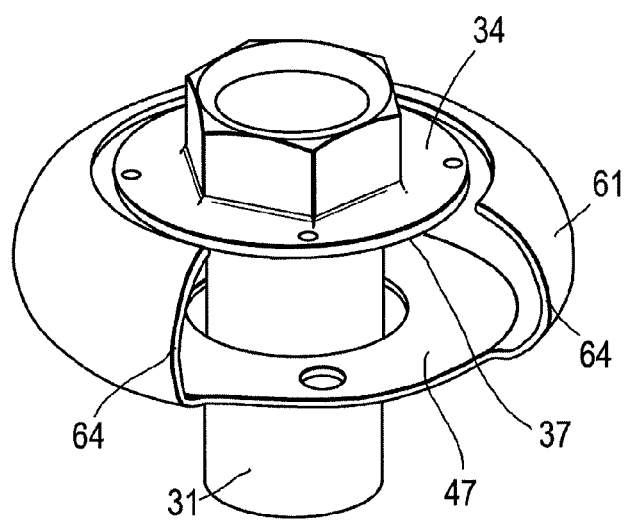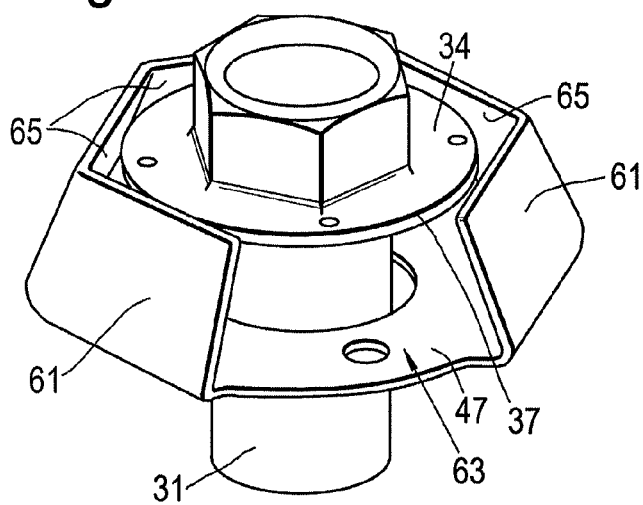

FLOW DEFLECTOR ARRANGEMENT

CROSS-REFERENCE TO RELATED APPLICATIONS

This application is based upon and claims the benefit of priority from British Patent Application Number 1315449.7 filed 30 Aug. 2013, the entire contents of which is incorporated by reference.

BACKGROUND OF THE INVENTION

1. Field of the Disclosure

The present invention relates to a flow deflector arrangement. More particularly the invention relates to a flow deflector arrangement for use in combination with a pipe arrangement secured through a component. The invention finds particular application in a gas turbine engine, where the component is a turbine case.

2. Description of the Related Art

Within a gas turbine engine it is usual to provide a number of service pipes around the case of a turbine within the core part of the engine. The service pipes pass generally radially through respective apertures formed in the turbine case and are secured to the turbine case by respective service pipe assemblies on the outside of the case. The service pipe assemblies each usually comprise a long-reach threaded hex nut which is tightened to secure the service pipe and the assembly in position. As will be appreciated, the service pipes all need to be sealed against the apertures via which they extend through the turbine casing to prevent the leakage of hot gases from within the turbine.

Given that the gas inside a turbine casing is extremely hot during operation of a gas turbine engine (typically approximately 790 Kelvin in the case of the high pressure turbine of an engine), leakage of the gas through the seals at service pipe positions around the turbine case, for example because of seal failure, is problematic because the high pressure of the gas within the turbine creates an outwardly directed jet of concentrated and very hot gas which can damage other engine components provided outside the turbine casing if it should impinge upon them. For example, in some gas turbine engine designs for the aeronautical industry, components of thrust reversing arrangements are often positioned outside the high pressure turbine, and these components can be damaged by exposure to hot gas leaking through service pipe connections.

In order to address the above-described problems associated with leakage of hot gas through the service pipe connections to the turbine, it has been proposed previously to fit flow deflectors to the hex nuts of each service pipe assembly in order to deflect any leakage flow of gas flowing outwardly from the turbine and generally along the pipe arrangement, such that it will not impinge on any vulnerable components outside the turbine. Such flow-deflectors are typically fitted to the hex nuts after the nuts have been tightened to secure the service pipe assemblies, and their use thus complicates assembly and engine service procedures. Additionally, prior art flow deflectors of this type add considerable mass to the engine and to the sensitive interface between internal and external pipes at the turbine case. The mass of the flow deflectors can increase the contact loading of the seals around the service pipe assemblies which can increase the risk of the seals failing through wear. It is also possible for prior art flow deflectors fitted to the hex nuts to work lose over time which can cause damage to the service pipes or other components in the area.

OBJECTS AND SUMMARY

It is a preferred object of the present disclosure to provide an improved flow deflector arrangement.

According to a first aspect, there is provided a flow deflector arrangement for use in combination with a pipe arrangement secured through a component, the flow deflector arrangement comprising: a nut to secure the pipe arrangement to said component, and a shroud configured for attachment to said component so as to extend at least partially around the pipe arrangement when the pipe arrangement is secured to said component by the nut; wherein the nut has an outwardly directed flange configured to adopt a position spaced from said component, and the shroud defines at least one deflector surface which, when the shroud is attached to said component around the pipe arrangement, extends away from said component in spaced relation to the pipe arrangement; the flange and said at least one deflector surface thus being configured to cooperate in deflecting a flow of fluid flowing from said component and along the outside of the pipe arrangement such that the flow is deflected generally outwardly from the pipe arrangement with a degree of swirl.

Preferably, the flange is formed integrally on the nut.

Conveniently, the nut and the flange may be provided as separate parts.

Advantageously, the flange is circular, and the shroud is generally annular.

The shroud may have a mounting plate for attachment to said component, the mounting plate defining an aperture configured to receive the pipe arrangement through the mounting plate.

The shroud is preferably configured such that when the shroud is attached to said component the or each said deflector surface extends away from said component by a distance which is at least equal to the spacing between said flange and the component.

The shroud is preferably configured for attachment to said component prior to the pipe arrangement, and wherein the shroud is configured to permit, thereafter, access to the nut for securing the pipe arrangement to said component.

The flange may have a planar surface configured to lie in facing relation to a surface of said component when the pipe arrangement is secured to said component by the nut.

Alternatively, the flange may have a stepped surface configured to lie in facing relation to a surface of said component when the pipe arrangement is secured to said component by the nut.

The shroud is preferably annular in form so as extend to around the pipe arrangement and may have a plurality of vanes arranged in spaced relation to one another around the shroud, each vane defining at least one said deflector surface.

Each said vane is preferably aerofoil-shaped.

Alternatively, the shroud may define a single deflector surface which is configured to extend only partially around the pipe arrangement, in spaced relation to the pipe arrangement, when the shroud is attached to said component around the pipe arrangement.

The nut may form part of the pipe arrangement.

The flow deflector arrangement of the present invention may be provided on a gas turbine engine, wherein said component is a turbine case within the engine and said pipe arrangement is a service pipe assembly secured through the turbine case.

According to another aspect, there is provided a gas turbine engine having a turbine case and a service pipe assembly secured through the turbine case, the engine having a flow deflector arrangement of the type described above, wherein said shroud is attached to the outside of the turbine case, around the service pipe assembly, and the service pipe assembly is secured through the turbine case by said nut, the flow deflector arrangement being configured to deflect any leakage flow of gas flowing outwardly through the turbine case and along the outside of the service pipe assembly during operation of the engine such that the leakage flow becomes mixed with air outside the turbine case.

BRIEF DESCRIPTION OF THE DRAWINGS

So that the disclosure may be more readily understood, and so that further features thereof may be appreciated, embodiments of the invention will now be described by way of example with reference to the accompanying drawings in which:

FIG. 5 is a schematic perspective view from above, showing a nut of a further configuration;

FIG. 6 is a schematic perspective view from above, showing a nut of yet another configuration;

FIG. 7 is a schematic perspective view from above, showing another configuration of nut;

FIG. 8 is a schematic perspective view showing a deflector shroud forming part of a flow deflector arrangement in accordance with an embodiment of the present invention;

FIG. 11 is a schematic perspective view showing a flow deflector arrangement incorporating an alternative configuration of deflector shroud;

FIG. 12 is a schematic perspective view showing a flow deflector arrangement incorporating another alternative configuration of deflector shroud; and FIG. 13 is a schematic perspective view showing a flow deflector arrangement incorporating a further alternative configuration of deflector shroud.

DETAILED DESCRIPTION OF THE PREFERRED EMBODIMENTS

Figure 1:
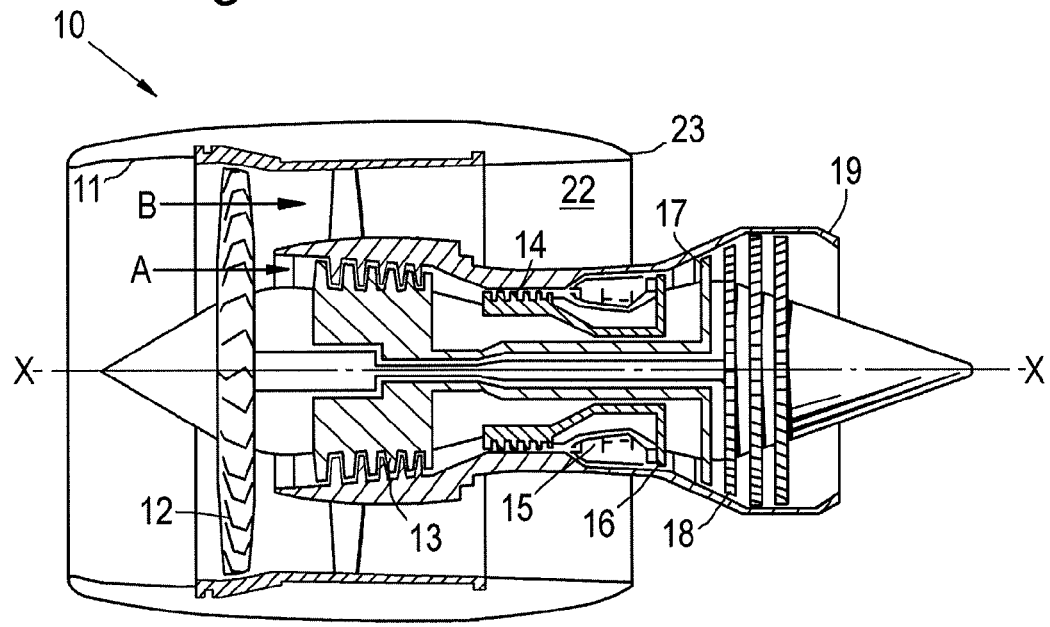
FIG. 1 shows schematically a longitudinal section through a gas turbine engine.

With reference to FIG. 1, a ducted fan gas turbine engine incorporating the invention is generally indicated at 10 and has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, and intermediate pressure turbine 17, a low-pressure turbine 18 and a core engine exhaust nozzle 19. A nacelle generally surrounds the engine 10 and defines the intake 11, a bypass duct 22 and a bypass exhaust nozzle 23.

During operation, air entering the intake 11 is accelerated by the fan 12 to produce two air flows: a first air flow A into the intermediate pressure compressor 13 and a second air flow B which passes through the bypass duct 22 to provide propulsive thrust. The intermediate pressure compressor 13 compresses the air flow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate pressure compressors 14, 13 and the fan 12 by suitable interconnecting shafts.

As is conventional, the individual turbines 16, 17, 18 of the engine 10 are provided with service pipes (not shown in FIG. 1) which are connected through the respective turbine cases via service pipe assemblies which may be provided with respective flow deflectors in accordance with the present invention and which are described below in more detail.

Figure 2:
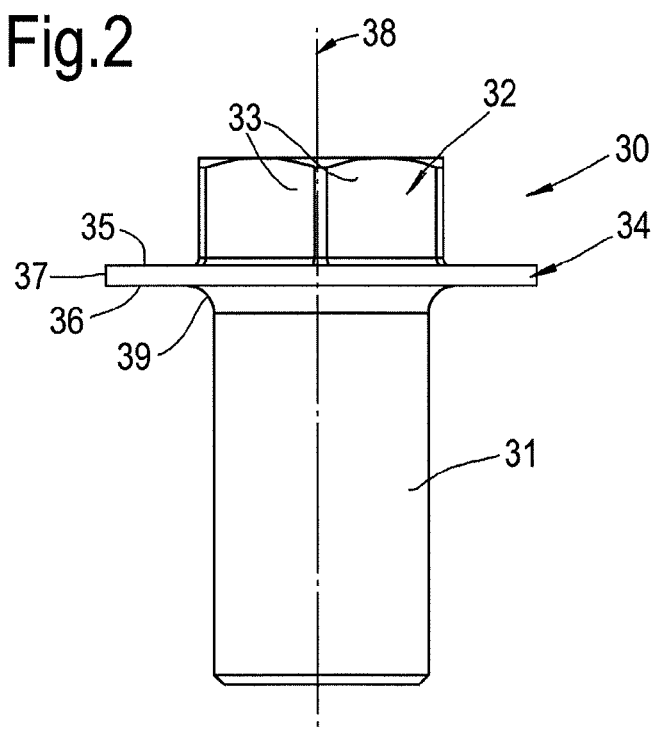
FIG. 2 is a schematic side elevational view showing a nut forming part of a flow deflector arrangement in accordance with an embodiment of the present invention.

Turning now to consider FIG. 2, there is illustrated a long-reach nut 30 which forms part of a service pipe assembly to connect a service pipe through an aperture in a turbine case. The nut 30 is internally screw threaded in a conventional manner and has an elongate hollow shank 31, and a head 32. The head 32 is configured for engagement by an appropriate tool for tightening and loosening the nut in a generally conventional manner, and so preferably has a conventional hex configuration as illustrated. The hex head 32 thus defines a plurality of generally planar facets.

The nut 30 also includes a generally circular flange 34 which extends outwardly from the shank 31, immediately below the level of the head 32 (in the orientation illustrated in FIG. 2). The flange 34 is generally planar in form and thus defines oppositely directed upper and lower annular and planar 35, 36 surfaces around the shank 31, both of which generally orthogonal to the longitudinal axis 38 of the nut. The flange also defines a peripheral edge 37 and has a diameter which is considerably greater than the diameter of both the shank 31 and the head 32. As will be noted from FIG. 2, because the flange 34 is provided between the shank 31 and the head 32, it does not interfere with the process of engaging an appropriate tool (such as a socket or a wrench) with the head 32 for the process of tightening or loosening the nut.

As indicated above, the lower annular surface 36 of the flange 34 of the nut illustrated in FIG. 2 is generally planar, although its intersection 39 with the cylindrical outer surface of the shank 31 is chamfered in order to provide a smooth transition between the outer surface of the shank 31 and the lower surface 36 for flow deflecting purposes, as will be explained in more detail below.

Figure 3:
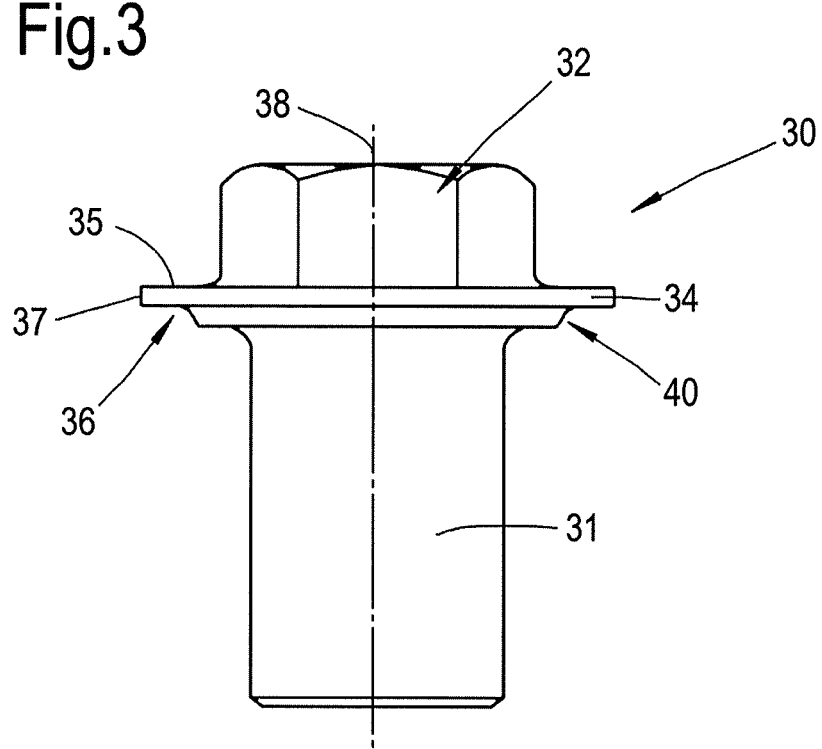
FIG. 3 is a schematic side elevational view showing a nut of an alternative configuration which can also be used in the present invention.

Turning now to consider FIG. 3, there is illustrated an alternative configuration of nut 30 which can be used in the flow-deflector of the present invention. In many respects the nut illustrated in FIG. 3 is identical to the one illustrated in FIG. 2, and so the same reference numerals are used to denote identical or equivalent parts, which will not be described in further detail. However, a notable difference is that the alternative configuration of nut 30 illustrated in FIG. 3 does not have a planar lower surface 36 as in the case of the nut illustrated in FIG. 2. Instead, the nut shown in FIG. 3 has a lower surface 36 which is stepped, at 40.

Figure 4:
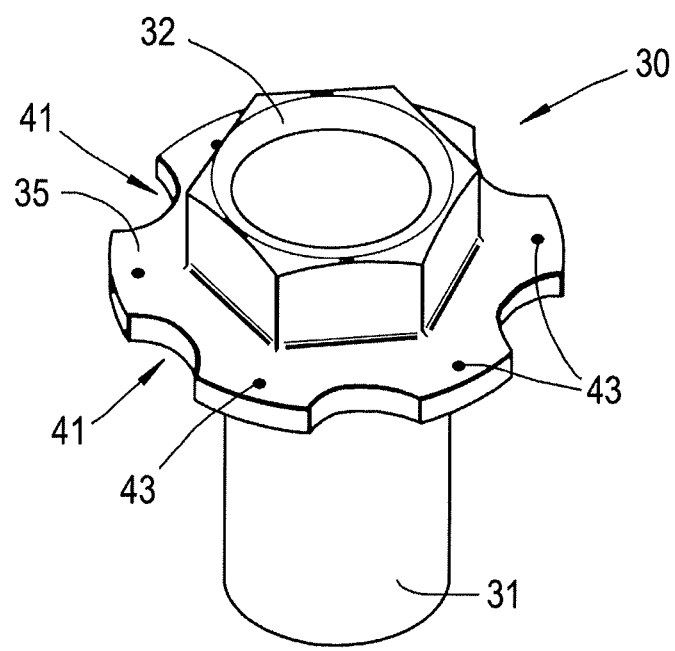
FIG. 4 is a schematic perspective view from above, showing a nut of another configuration.

FIG. 4 shows an alternative flange configuration which can be provided in either the planar configuration of FIG. 2, or the stepped configuration of FIG. 3. As will be noted, rather than being perfectly circular, this configuration of flange 34 has a generally circular profile, but is modified by the addition of a plurality of spaced-apart notches or recesses 41 formed around the peripheral edge 37, each of which is concave in form and extends inwardly from the otherwise circular peripheral edge. Additionally, the flange 34 is provided with a plurality of small flow ports 43, each of which is located generally adjacent the peripheral edge of the flange and between a pair of the notches or recesses 41.

The alternative flange 34 illustrated in FIG. 5 can be considered similar to the configuration illustrated in FIG. 4 in the sense that it also has a generally circular profile with a plurality of spaced-apart notches or recesses 41 formed around its peripheral edge 37. However, in this embodiment the notches or recesses 41 are not arcuate, but rather are square or rectangular in form. Furthermore, each notch or recess 41 is defined by a pair of opposed parallel side edges 44 which extend approximately (although not exactly on account of their parallel and spaced-art relationship) radially inwardly from the peripheral edge 37. The side edges 44 of each notch or recess 41 define respective planar surfaces which are parallel and inclined relative to the planes of the upper and lower flange surfaces 35, 36 such that they each make an equal acute angle to the planes of the upper and lower flange surfaces 35, 36. The notches or recesses 41 are thus configured to deflect any fluid flow passing through them from a generally axial direction along the shank 31 of the nut, such that the fluid flow becomes directed generally tangentially relative to the axis 38 of the nut, and at an acute upwards angle relative to the flange 34.

FIG. 6 illustrates another possible flange configuration, in which the flange 34 is again provided with a plurality of generally rectangular notches or recesses 41 around its peripheral edge 37. However, it will be noted that in this arrangement, there are more notches or recesses 41 than in the arrangement of FIG. 5, such that the notches or recesses 41 are spaced more closely to one another. Also it will be noted that in this arrangement the parallel side edges 44 of each notch or recess 41 are somewhat shorter than those of the arrangement shown in FIG. 5, and also are shown to define respective surfaces which are perpendicular to the upper and lower planar surfaces 35, 36 of the flange.

FIG. 7 shows another possible configuration of the flange 34, in which the flange is circular in form having an uninterrupted peripheral edge 37, but is instead provided with a plurality of relatively large flow ports 45 around its annular extent, in addition to the smaller flow ports 43.

It is to be noted that regardless of the actual profile of the flange 34, the flange 34 will preferably be formed integrally with the nut 30. However, it is also possible to provide the flange as a separate integer configured for secure attachment to the nut 30

Turning now to consider FIG. 8, there is illustrated a generally annular shroud 46 which is provided as a separate component to the nut 30. As will be explained in more detail below, the shroud 46 and the flanged nut 30 are configured to cooperate in deflecting a leakage flow of fluid.

The shroud comprises a pair of spaced apart annular plates, namely a mounting plate 47 and a top plate 48, both of which have circular peripheral edges 49, 50 of generally equal diameter. The mounting plate defines a central aperture 51 which is sized to receive therethrough the shank 31 of the nut 30, which it will be remembered will form part of a service pipe assembly when appropriately mounted to the turbine case of the engine. The central aperture 51 is preferably sized so as to be slightly larger than the outer diameter of the shank 31. Around the central aperture 51, there are provided a plurality of smaller spaced-apart mounting apertures 52.

As shown in FIG. 8, the top plate 48 also defines a central aperture 53, which is significantly larger in diameter than the central aperture of the mounting plate 47. The central aperture 53 is preferably slightly larger than the outer diameter of the flange 34 provided on the nut 30.

The mounting plate 47 and the top plate 48 are interconnected and spaced apart by a plurality of circumferentially spaced apart vanes 54 which are arranged in partially overlapping relation to one another around the shroud. The vanes 54 are each aerofoil-shaped in cross-section and define respective leading edges 55 and trailing edges 56. In the particular arrangement illustrated, the leading edges 55 of the vanes are all equi-spaced from the centre of the shroud, and the trailing edges 56 are all provided in alignment with the peripheral edges 49, 50 of the two plates 47, 48. As will be noted, the vanes 54 are arranged generally tangentially around the shroud so as to define curved and outwardly extending flow passage 57 between each adjacent pair. Each vane defines a pair of opposed deflector surfaces 54*a* extending between its leading and trailing edges.

Figure 9:
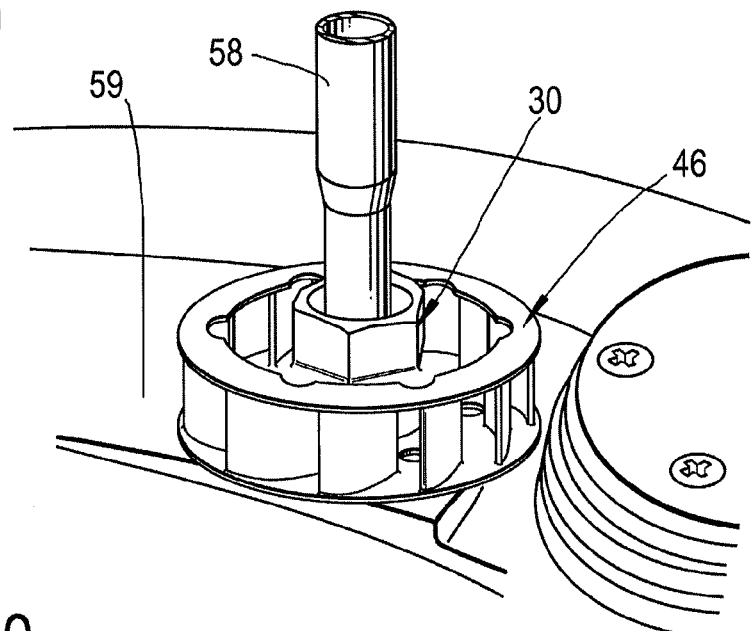
FIG. 9 is a schematic perspective view showing a complete flow deflector arrangement in accordance with the present invention, installed in a gas turbine engine having a service pipe arrangement.

Turning now to consider FIG. 9, the nut 30 and shroud 46 are shown in combination with a service pipe assembly 58 which is mounted through an aperture (not visible in FIG. 9) through the case 59 of a turbine within the core of a gas turbine engine, in order to define a flow deflector arrangement in accordance with the present invention. It will be noted that the flange 34 of the nut shown in FIG. 9 is the simple circular configuration shown in FIG. 2.

In order to assemble the flow deflector arrangement, the shroud 46 is first secured in position against the outside of the turbine case 59, such that the mounting plate 47 sits against the outer surface of the case 59, with its central aperture 51 aligned over the pipe-aperture formed in the case 59. The shroud is connected to the case 59 via bolts or other similar fasteners, through the mounting apertures 52. Thereafter, the service pipe assembly 58 is connected to the turbine case 59 in a generally conventional manner, such that the long-reach nut 30 passes through the centre of the annular shroud 46 as illustrated in FIG. 9. As will be noted, because the central aperture 53 formed in the top plate 48 of the shroud is larger in diameter than the flange 34 of the nut 30, the nut can be installed through the shroud 46 after the shroud has been mounted to the turbine case 59. Furthermore, it will be noted that because the flange 34 is provided beneath the hex head 32, the head 32 can easily be engaged by an appropriate tool in order to tighten the nut 30, even in the presence of the shroud 46.

As also illustrated in FIG. 9, when the nut 30 is installed to secure the service pipe assembly 58, its flange 34 adopts a position in which it is spaced from the turbine case 59, such that the lower surface 36 of the flange lies in facing relation to the outer surface of the turbine case, with the mounting plate 47 of the shroud 46 therebetween. The flange 34 of the nut also adopts a position in which it lies beneath the level of the top plate 48 of the shroud 46, such that the vanes 54 all extend away from the turbine case, in radially-spaced relation to the pipe assembly and the shank 31 of the nut, and slightly past the flange 34.

In the event of failure of the seal provided between the pipe assembly 58 and the turbine case 59, a leakage flow of very hot gas will be produced which will be directed generally along the outside of the shank 31 of the nut 30, which of course effectively forms part of the service pipe assembly. Any such leakage flow will thus be directed outwardly from the turbine case and into the annular space defined between the shank 31, the flange 34, and the vanes 54 of the shroud 46. Components of the leakage flow directed generally along the shank 31 will thus impinge against the lower surface 36 of the flange 34 and will thereby be deflected so as to be redirected generally radially outwardly away from the shank and the pipe assembly and towards the vanes 54 and their respective deflector surfaces 54a. The deflected leakage flow will thus be directed between adjacent vanes 54 and thus through the curved flow passages 57 defined between the vanes 54. The curved configuration of the vanes 54, and their tangential configuration, imparts a degree of swirl to the leakage flow as it is directed outwardly through the flow passages 57. The flange 34 and the vanes 54 of the shroud thus cooperate to deflect the leakage flow of gas and impart swirl to it which facilitates improved mixing of the very hot leakage flow with cooler bulk air outside the turbine case 59, thereby preventing very hot gas from impinging on any vulnerable engine components in the area.

Figure 10:
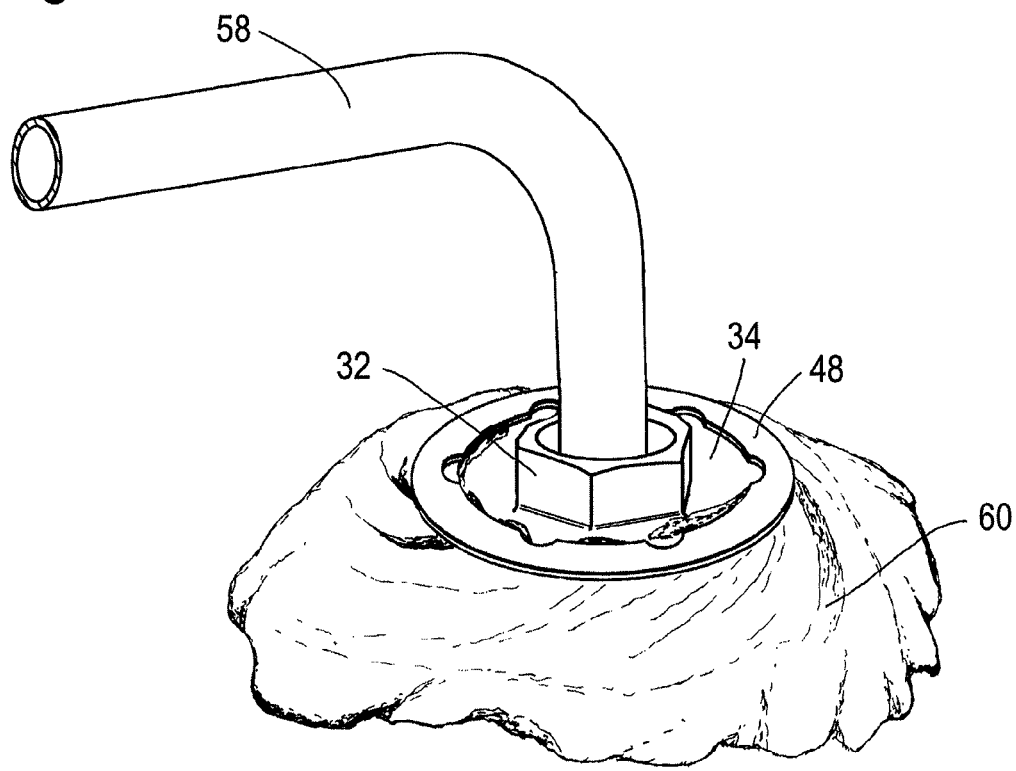
FIG. 10 is a schematic perspective view showing the flow deflecting effect of the flow deflector arrangement illustrated in FIG. 9.

FIG. 10 is a Computational Fluid Dynamics representation of the deflected leakage flow 60, and clearly illustrates the swirl imparted to the flow, generally around the central axis of the nut and pipe assembly.

It is to be noted that any of the other previously described alternative flange configurations can be used with the shroud 47 in a generally similar manner, in which case the particular flow characteristics of the deflected flow will be slightly different. For example, the presence of the notches or recesses 41, and/or flow apertures 43, 45 in the flange 34 will permit some of the deflected flow to pass through the flange and/or between the flange and the shroud, in additional to the major component of the deflected flow which will pass between the vanes of the shroud.

It is to be appreciated that other configurations of the shroud 46 are also suitable for use with the flow deflector arrangement of the present invention. For example, an alternative shroud 46 is illustrated in FIG. 11, the shroud being shown in combination with a flanged nut 30 having a flange 34 of the simple circular configuration shown in FIGS. 2, 9 and 10.

The shroud 46 shown in FIG. 11 has a mounting plate 47 of similar configuration to the shroud shown in FIGS. 8 and 9. However, this configuration of shroud has no top plate, or vanes 54 of the type described previously. Instead, the shroud 46 comprises a curved side wall 61 which extends upwardly from the edge of the mounting plate 47 and which extends around the major proportion of the pipe assembly and shank 31 of the nut 30. The side wall 61 terminates with an upper edge 62 which, when the shroud is mounted to the turbine case and the nut 30 is tightened to secure the pipe assembly (in the relative positions illustrated in FIG. 11), is spaced slightly further from the turbine case than the flange 34.

As illustrated, because the side wall 61 extends only partially around the nut 30 when installed in the relative positions illustrated, a flow opening 63 is defined between the two end edges 64 of the side wall 61.

The inner surface 65 of the sidewall 61 thus effectively defines a deflector surface which extends most, but not all of the way around the shank 31 of the nut and which cooperates with the flange 34 to deflect a leakage flow outwardly from the shank and with a degree of swirl. In this arrangement, the swirl is imparted to the leakage flow due the circular profile of the inner deflector surface 65 of the side wall 61, and the leakage flow is directed outwardly through the flow opening 63 defined between the end edges 64 of the side wall.

FIG. 12 illustrates another configuration of shroud 46, which can be considered a modification of the arrangement illustrated in FIG. 11. In this arrangement, the sidewall 61 does not extend orthogonally relative to the mounting plate 47 of the shroud, but instead has a curved profile in cross-section, such that it extends radially outwardly and away from the mounting plate 47 before curving back towards the peripheral edge 37 of the flange 34. The shroud shown in FIG. 12 cooperates with the flange 34 in a similar manner to the arrangement shown in FIG. 11 and described above, but the curved cross-sectional profile of the sidewall 61 creates a larger space between its inner deflector surface 65, the shank 31 and the flange 34.

FIG. 13 illustrates another alternative configuration of shroud 46. In this arrangement, the mounting plate 47 is generally polygonal, with a respective planar sidewall 61 extending away from each edge of the mounting plate 47, and generally towards the peripheral edge 37 of the flange 34. The sidewalls 61 each define a respective inner deflector surface 65, the deflector surfaces 65 all cooperating to encircle the shank 31 of the nut 30. As will be noted, one side edge of the mounting plate 47 is free of any sidewall 61, the gap between the two adjacent sidewalls defining a flow opening 63 similar to those of the shrouds illustrated in FIGS. 11 and 12.

When used in this specification and claims, the terms "comprises" and "comprising" and variations thereof mean that the specified features, steps or integers are included. The terms are not to be interpreted to exclude the presence of other features, steps or integers.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

We claim:

1. A flow deflector arrangement for use in combination with a pipe arrangement secured with a component, the flow deflector arrangement comprising:
   a nut configured to secure the pipe arrangement to the component, the nut including an outwardly directed flange, and
   a shroud configured for attachment to the component so as to extend at least partially around the pipe arrangement when the pipe arrangement is secured to the component by the nut,
      the shroud including a plurality of vanes arranged in spaced relation to one another around the shroud, the vanes each extending between a top plate and a mounting plate of the shroud, and the vanes each forming a deflector surface, wherein, when the pipe arrangement is secured to the component by the nut:

the flange is configured to be spaced apart from the component, the deflector surfaces each extend away from the component in spaced relation to the pipe arrangement, and the flange and the deflector surfaces are configured to cooperate in deflecting a flow of fluid flowing from the component and along an outside of the pipe arrangement such that the flow is deflected generally outwardly from the pipe arrangement with a degree of swirl.

2. The flow deflector arrangement according to claim 1, wherein the flange is formed integrally on the nut.

3. The flow deflector arrangement according to claim 1, wherein the nut and the flange are provided as separate parts.

4. The flow deflector arrangement according to claim 1, wherein the flange is circular, and the shroud is generally annular.

5. The flow deflector arrangement according to claim 1, wherein the mounting plate defines an aperture that is configured to receive the pipe arrangement through the mounting plate.

6. The flow deflector arrangement according to claim 1, wherein the shroud is configured such that when the shroud is attached to the component, the deflector surfaces each extend away from the component by a distance which is at least equal to a spacing between the flange and the component.

7. The flow deflector arrangement according to claim 1, wherein:

the shroud is configured for attachment to the component prior to the pipe arrangement, and the shroud is configured to permit, thereafter, access to the nut for securing the pipe arrangement to the component.

8. The flow deflector arrangement according to claim 1, wherein the flange has a planar surface configured to lie in facing relation to a surface of the component when the pipe arrangement is secured to the component by the nut.

9. The flow deflector arrangement according to claim 1, wherein the flange has a stepped surface configured to lie in facing relation to a surface of the component when the pipe arrangement is secured to the component by the nut.

10. The flow deflector arrangement according to claim 1, wherein the shroud is annular such that the shroud extends around the pipe arrangement when the pipe arrangement is secured to the component by the nut.

11. The flow deflector arrangement according to claim 10, wherein the vanes are each aerofoil-shaped.

12. The flow deflector arrangement according to claim 1, wherein the shroud defines a single deflector surface which is configured to extend only partially around the pipe arrangement, in spaced relation to the pipe arrangement, when the shroud is attached to the component around the pipe arrangement.

13. The flow deflector arrangement according to claim 1, wherein the nut forms part of the pipe arrangement.

14. The flow deflector arrangement according to claim 1, wherein the component is a turbine case within a gas turbine engine and the pipe arrangement is a service pipe assembly secured through the turbine case.

15. A gas turbine engine having a turbine case and a service pipe assembly secured through the turbine case, the engine having a flow deflector arrangement according to claim 1, wherein:

the shroud is attached to the outside of the turbine case, around the service pipe assembly, the service pipe assembly is secured through the turbine case by the nut, and the flow deflector arrangement is configured to deflect any leakage flow of gas flowing outwardly through the turbine case and along the outside of the service pipe assembly during operation of the engine such that the leakage flow becomes mixed with air outside the turbine case.

* * * * *